United States Patent
Claeys et al.

(10) Patent No.: US 8,018,190 B2
(45) Date of Patent: Sep. 13, 2011

(54) METHOD AND DEVICE FOR CONTROLLING AND MONITORING A HYBRID FOUR-WHEEL DRIVE VEHICLE

(75) Inventors: Xavier Claeys, Versailles (FR); Philippe Pognant-Gros, Rueil-Malmaison (FR); Richard Pothin, Jouars-Pontchartrain (FR)

(73) Assignee: Renault S.A.S., Boulogne-Billancourt (FR)

( * ) Notice: Subject to any disclaimer, the term of this patent is extended or adjusted under 35 U.S.C. 154(b) by 618 days.

(21) Appl. No.: 12/096,392

(22) PCT Filed: Nov. 21, 2006

(86) PCT No.: PCT/FR2006/051206
§ 371 (c)(1),
(2), (4) Date: Jun. 6, 2008

(87) PCT Pub. No.: WO2007/066023
PCT Pub. Date: Jun. 14, 2007

(65) Prior Publication Data
US 2009/0021203 A1    Jan. 22, 2009

(30) Foreign Application Priority Data
Dec. 8, 2005    (FR) .................................... 05 53784

(51) Int. Cl.
*H02P 7/00*    (2006.01)

(52) U.S. Cl. ........................................ 318/432; 318/139
(58) Field of Classification Search .................. 318/139, 318/140, 798, 800, 801, 432, 434
See application file for complete search history.

(56) References Cited

U.S. PATENT DOCUMENTS

| | | | |
|---|---|---|---|
| 5,450,324 A * | 9/1995 | Cikanek | 701/108 |
| 6,909,959 B2 * | 6/2005 | Hallowell | 701/88 |
| 2002/0057582 A1 | 5/2002 | Nakayama et al. | |
| 2003/0037977 A1 | 2/2003 | Tatara et al. | |
| 2003/0132044 A1 | 7/2003 | Kitano et al. | |
| 2004/0147366 A1 | 7/2004 | Aoki et al. | |
| 2004/0176899 A1 * | 9/2004 | Hallowell | 701/84 |

FOREIGN PATENT DOCUMENTS

| | | |
|---|---|---|
| EP | 1 533 166 | 5/2005 |
| WO | 2004 106101 | 12/2004 |

* cited by examiner

*Primary Examiner* — Rina Duda
(74) *Attorney, Agent, or Firm* — Oblon, Spivak, McClelland, Maier & Neustadt, L.L.P.

(57) ABSTRACT

A method for controlling and monitoring a hybrid vehicle including a driving internal combustion engine, and an electric machine that is operational, upon an instruction, in a form of a driving engine and is powered by a battery. The method detects a vehicle operating state, in transmitting, in response, an operating instruction to the electric machine only, without requesting any particular instruction from the internal combustion engine and respecting the vehicle stability constraint and a protecting constraint of the electric components thereof.

16 Claims, 5 Drawing Sheets

Diagram of the control architecture

METHOD AND DEVICE FOR CONTROLLING AND MONITORING A HYBRID FOUR-WHEEL DRIVE VEHICLE

BACKGROUND

The invention relates to a method and a device for controlling and supervising a hybrid vehicle of the type comprising four drive wheels. More particularly, the invention relates to a method and a device for controlling and supervising a rear axle unit of a hybrid vehicle with four drive wheels, having as vehicle propulsion and/or traction means at least one electric machine supplied by a high-voltage battery and an engine. The method makes it possible to retranscribe the driver's desire, such as a depression of the accelerator pedal, into control settings to be dispatched to electrical and mechanical actuators.

The advantages of electric vehicles are known and originate in particular from the silent and non-polluting nature of their motor. The question of the recharging of their battery is substantially improved by hybrid vehicles which make it possible to reach autonomy and performance levels that are hardly achievable in the case of a purely electric vehicle.

The technical problem underlying the invention has been identified by the applicant within the framework of studies on new hybrid vehicles with four drive wheels and equipped with an independent mechanical power source on each axle unit. The front axle unit of the vehicle is driven by a conventional power train with an internal combustion engine and a manual, robotized or automatic gearbox. The rear axle unit is driven by an electric actuator which is an electric machine capable of providing a torque and power to the wheel by way of a differential. The energy storage element comprises a battery for providing or receiving energy coming from the electric machine operating either as a motor, or as a generator. Thus, the electric machine operating as a motor is capable of providing a required torque and power to the wheels of a given axle unit.

The engine associated with the electric motor in this kind of hybrid vehicle makes it possible either to add extra power for on-road journeys, or to recharge the battery either with the aid of a current generator or with the aid of the electric motor when it is reversible and is operating as a generator.

In the prior art, the supervision of a hybrid vehicle implements a supervision function which makes it possible to transform the driver's desire into control settings to be dispatched simultaneously to the electric machine and to the engine. Such supervision must also ensure a minimum safety of the behavior of the vehicle such as the command of the rear axle unit so as to satisfy a stability criterion of the vehicle when it operates in "four-wheel drive" mode. The supervision device must also ensure the safety of the electrical items such as the high-voltage battery and the electric machine, particularly the control of the admissible power under charge and under discharge through the battery.

Solutions for supervising the management of the controls of the hybrid vehicle with an axle unit equipped with an electric motor and an axle unit equipped with an engine are known in the prior art. Document US-2002/0057582 describes and represents a controller for managing the electrical power supply of such a hybrid vehicle. But this controller only makes it possible to limit the conversion of electrical energy coming from the battery which supplies in particular the electric machine so as to forestall excessive discharging of the battery and to protect the electrical items of the vehicle. The controller acts simultaneously on the control of the electric machine and on that of the engine.

Though document US-2002/0057582 provides for a solution for protecting the electrical items of a hybrid vehicle, it does not make it possible to supervise at the same time the behavior and the stability of the vehicle driven by four drive wheels.

BRIEF SUMMARY

To remedy these drawbacks of the prior art, the invention proposes a method for controlling and supervising a hybrid vehicle of the type comprising:
  a driving engine;
  an electric machine able on command to operate as driving motor and supplied by a battery characterized in that it consists:
  in detecting the operating state of the vehicle; and
  in producing in response an operating setting for the electric machine alone, without demanding any particular control of the engine, while ensuring compliance with a stability constraint for the vehicle and with a protection constraint for the electrical items of the vehicle.

It also relates to a device for controlling and supervising a hybrid vehicle comprising:
  a driving engine;
  an electric machine able on command to operate as driving motor and supplied by a battery, characterized in that it comprises:
  a module for detecting operating state of the hybrid vehicle which produces an operating state vector; and
  a module making it possible to establish a setting on the basis of the operating state vector, said module cooperating with a stability control unit for the vehicle and an electrotechnical protection unit for the electrical items of the vehicle, said setting being applied to the electric machine alone of the hybrid vehicle.

According to other characteristics of the invention:
  the control and supervision method comprises: steps of collecting information on the operating state of the engine, of the electric machine as well as the driver's desire; a step of generating a command value on the basis of the information collected which commands command functions; a step of commanding the electric machine on the basis of the command value which executes a command function as a function of the driver's desire; a safety step which activates, in the event of an electrotechnical defect, a safety function imposing a zero torque on the electric machine and which disconnects the battery; a priority selection step which activates by priority the safety function in the event of an electrotechnical defect; steps of controlling the electrical items which transmits control signals to the battery and to the electric machine on the basis of the function selected in the previous step;
  the control and supervision device comprises: means for collecting information relating to the operating state of the engine and of the electric machine as well as the driver's desire; means for interpreting, as a function of the information collected by the collection means, the driver's desire; control means selecting a command function and/or a safety function on the basis of the interpretation of the driver's desire arising from the interpretation means; means for commanding, on the basis of the command and/or safety function selected by the control means, components for monitoring the electrical items such as the battery and the electric machine; and finally means for shaping the output signals coming from the command means;

the control and supervision device comprises three successive functional layers: a first layer bundling together the means which generate a variable activating the command; a second layer bundling together the means which execute the command control on the basis of the value of the command variable; and a third layer bundling together the means which execute the command of the components for monitoring the electrical items;

the means for collecting information comprise several sensors of different kind which pertain to the signals in particular: on the control of the engine, the position of the acceleration pedal, the effective mean torque, the position of the brake pedal, the status of the engine, etc.; on the electrical items of the vehicle in particular the speed of the electric motor, the various operating defects, the temperature of the battery, the voltage and the current of the battery, the acceptable power under charge and under discharge through the battery and its state of charge; on the dynamics of the vehicle in particular the speeds of the four wheels, the braking pressures of the four wheels, a measurement of the longitudinal and lateral acceleration of the vehicle, a measurement of angle of deflection of the steering wheel, a measurement of the yaw rate; and signals such as the emergency stop wired signals, various dashboard switches conveying the driver's desire, signals of the isolation defect detectors coming from the battery;

the means for interpreting the driver's desire comprise means for analyzing the information coming from the collection means and transmitting as a function of this information a command variable whose value selects an associated command or safety function in the following control means;

the command variable is associated with means for selecting one of the command and/or safety functions in the control means, including in particular: a function comprising means for activating the starting of the vehicle; a function which bundles together means for activating the electrotechnical part when the driver wishes to start the hybrid vehicle; a function which bundles together means for turning off electrotechnical items when the vehicle is stopped; a function which bundles together means for placing the electric machine in a standby mode where the electrical torque is zero, under deceleration in pure thermal mode; a function which bundles together means for recovering electrical energy, under deceleration in hybrid mode; a function which bundles together means for placing the electric machine in standby mode where the electrical torque is zero, under acceleration in pure thermal mode; a function which bundles together means for allowing the driving of the vehicle in four-wheel drive mode, the electrical torque is proportional to the crankshaft torque or calculated so as to optimize the motricity of the vehicle, under acceleration in hybrid mode; a function which bundles together means for calculating the electrical torque on the basis of the acceleration pedal position so as to establish a ramping of automatic gearbox type: a ramping in torque and a ramping in speed onwards of a given threshold, in pure electrical mode; and a safety function which bundles together means for dispatching a zero torque setting to the electric machine for disconnecting the high-voltage main contactor so as to isolate the battery from the remainder of the vehicle in the event of a major operating defect of the electrotechnical part;

the control means comprises a means which limits the value of electrical torque setting so as to satisfy the stability criteria of the vehicle;

the means for commanding the components for monitoring the electrical items comprise means for monitoring the battery so as to isolate the battery from the remainder of the vehicle;

the means for commanding the components for monitoring the electrical items comprise a means for commanding the electric machine which comprises means for transmitting to the electric machine a torque setting suited to the operating limitations of the electrical items and to vehicle stability.

BRIEF DESCRIPTION OF THE DRAWINGS

Other characteristics and advantages of the invention will become apparent on reading the detailed description which follows, for the understanding of which reference will be made to the appended drawings in which.

DETAILED DESCRIPTION

Figure 6:
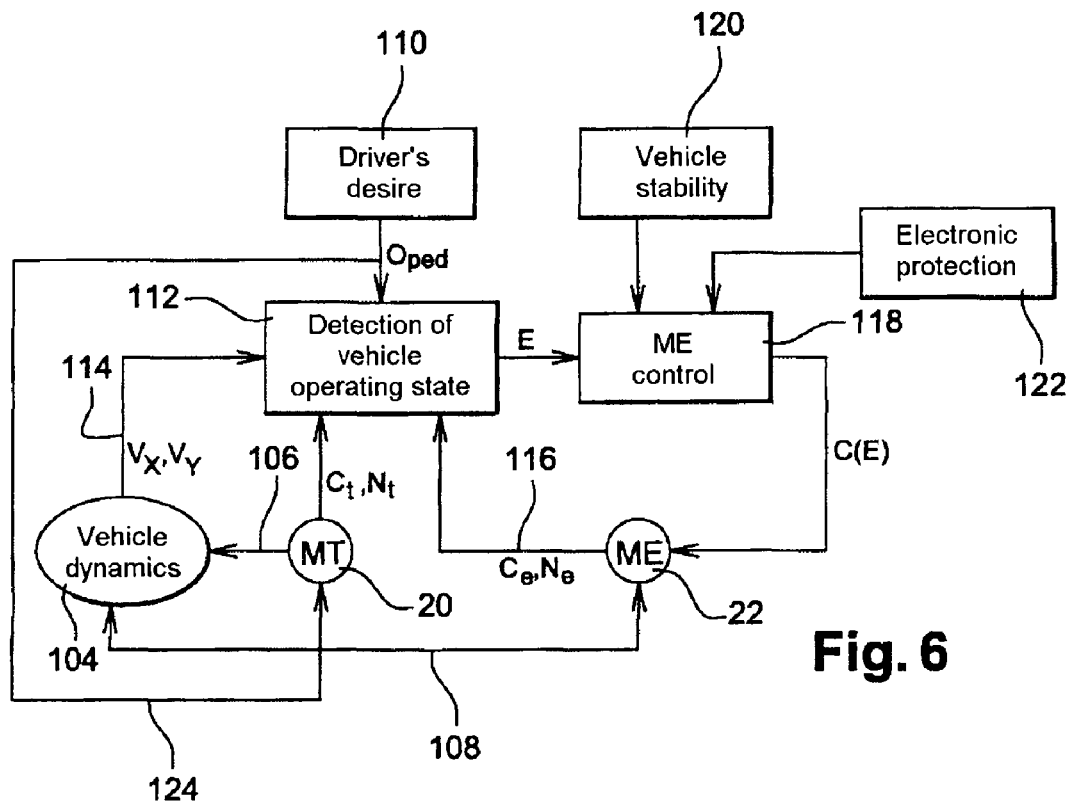
FIG. 6 is a block diagram of a device for supervising a hybrid vehicle in a particular embodiment.

Represented in FIG. 6 is a particular embodiment of a device for supervising a hybrid vehicle according to the invention.

The hybrid vehicle is modeled by a dynamic platform 104 which is driven with the aid of a mechanical link 106 by an engine 20 and with the aid of a mechanical link 108 by an electric machine 22.

The electric machine 22 being reversible as electrical generator or as electric motor, the mechanical link 108 is bidirectional.

The dynamic platform 104 of the vehicle is equipped with a plurality of sensors of the stability or of the state of stability of the vehicle which produce signals representative of vehicle operating state parameters such as various speeds and linear and angular accelerations in relation to various reference axes of the vehicle as is already known. The data of these sensors are transmitted by a link 114 to an operating state detection module 112 of the hybrid vehicle.

The operating state detection module 112 of the hybrid vehicle is also linked by a link 114 to sensors of the operating state of the engine 20, in particular by estimation or measurement or calculation of the thermal torque Ct and of the thermal revs Nt.

The module 112 for detecting the operating state of the hybrid vehicle is also linked by a link 116 to sensors of the operating state of the electric machine 22, in particular by estimation or measurement or calculation of the electrical torque parameters Ce, which may be positive if the electric machine operates as a motor, or negative if it works as a generator, and also its revs or rotation speed Ne.

Additionally, the cockpit 110 of the vehicle is furnished with means for detecting the driver's desire, such as for example a sensor of pedal angle θped of depression of the accelerator pedal, a steering wheel deflection angle sensor, a vehicle acceleration sensor, which make it possible in particular through a direct link 124 to adjust for example the degree of opening of the gas intake butterfly valve of the engine 20.

Additionally, such a driver's desire parameter θped is also applied to the module 112 for detecting the operating state of the state of the vehicle.

The module 112 for detecting the operating state, produces an instantaneous signal comprising a list of the various aforesaid parameters which describe the operating state of the vehicle and which is transmitted to the input of a second module 118 making it possible to establish a setting or a control of the electric machine 22 alone so as to supervise or control the trim of the hybrid vehicle as a whole.

The module 118, for this purpose, is connected respectively to a stability control unit for the vehicle 120 and to an electrotechnical protection unit 122 for the electrical items of the vehicle.

On the basis at one and the same time of the operating state signal E for the stability state arising from the module 120 of the protection state 122, the second module 118 produces a control signal for the electric machine C(E) alone which is applied to a control circuit for the electric machine 22 while complying at one and the same time with the stability of the vehicle, the driver's intention and the electrotechnical protection of the electrical items of the vehicle.

For this purpose, although this has not been portrayed in FIG. 6, the electric machine 22 cooperates with a command circuit which is supplied electrically by an electrochemical battery.

The command circuit is customarily composed of an H bridge whose switches are commanded under pulse width modulation of the circuit for commanding the electric machine so as to vary the electrical power exchanged between the electric machine, on the one hand, and the battery, on the other hand.

The control signal C(E) makes it possible to vary in particular the pulse width modulation rate so as to control the dynamic behavior of the vehicle while complying with the electrotechnical protection criteria taken into account by the module 122 as well as the vehicle stability constraints taken into account by the module 120. It will be noted that this control architecture is achieved by controlling the operation of the electric machine 22 alone whatever control is or is not applied to the engine 20.

Particularly, if the engine 20 produces too much power, the latter can be partially diverted by the setting C(E) which determines a generator mode of the electric machine 22.

Conversely, if the stability of the vehicle is compromised according to the stability constraint analysis module 120, the signal C(E) induces the electric machine 22 to operate as a motor so that stability is recovered.

It is noted that this architecture makes it possible to solve vehicle stability and electrotechnical protection constraints which have been described and which will be defined further on in the body of the text in a simplified manner without having to work on the engine.

Figure 7:
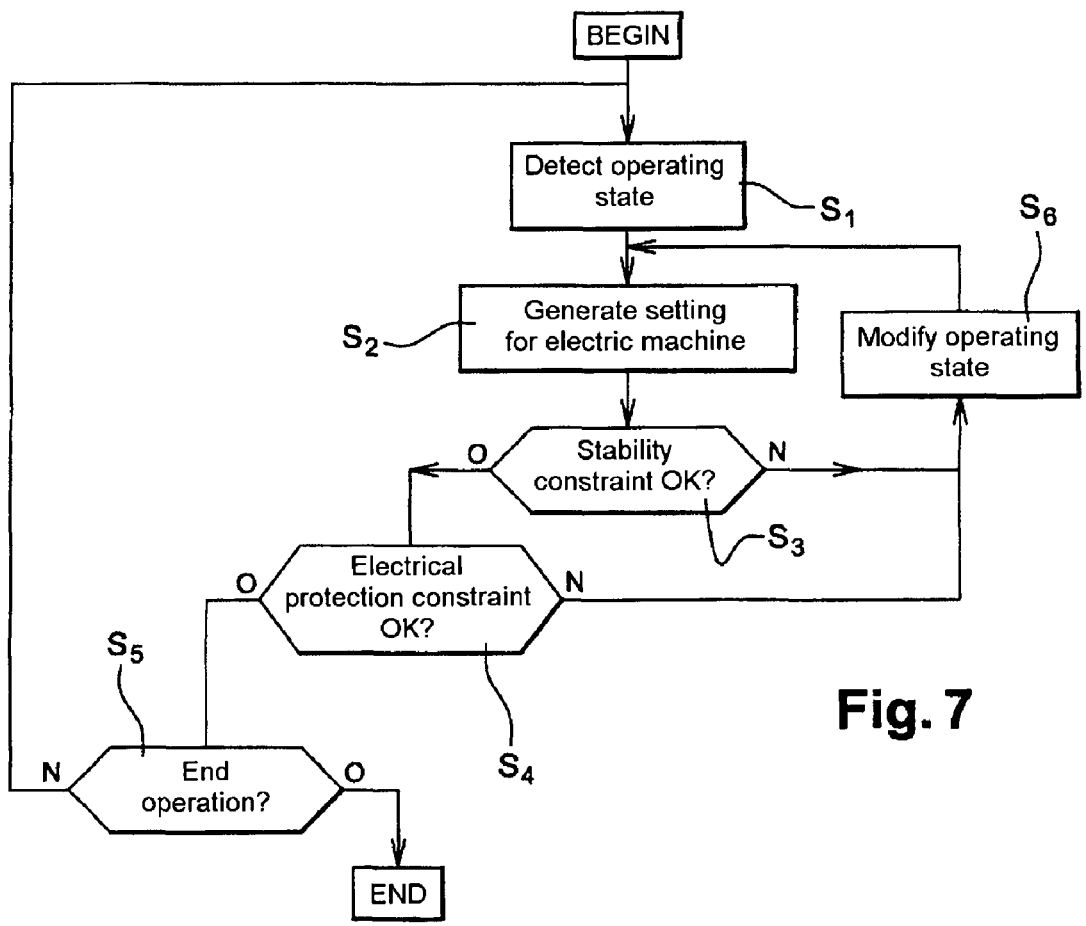
FIG. 7 is a flowchart of software implementing the method for supervising and controlling the hybrid vehicle of the invention.

Represented in FIG. 7 is a flowchart of the supervision method of the invention, in particular when this method is implemented in the form of software in a vehicle computer.

After a begin step which can be instigated by manipulating the contact key requesting that the vehicle be made operational, the detection of the vehicle's operating state E is executed during a step S1.

This step makes it possible to collect, for example at predetermined instants, the various aforesaid parameters representative of the operating state of the vehicle as was described with the aid of FIG. 6.

On completion of this step, the data representative of the operating state of the vehicle are taken into account during a step S2 to generate an operating setting C(E) of the electric machine 22 alone.

This electrical setting does not demand that a particular control be applied to the engine 20.

It is executed by ensuring compliance with a stability constraint for the vehicle and with a protection constraint for the electric machine 22, as has already been described with the aid of the device of FIG. 6.

For this purpose, once a first setting level has been produced on completion of step S2, there is executed during a test S3 if the stability constraint for the vehicle is complied with.

In the positive case, the test of compliance with the constraint of the electrotechnical protection of the electrical items of the vehicle is executed during a step S4.

If step S4 is positive, the indication of an end of operation of the vehicle is tested during a step S5.

If step S5 is negative, control returns to the vehicle operating state detection step S1 and the loop continues.

On the other hand, the loop is interrupted if step S5 is positive and at that moment, an end step is executed which makes it possible to place the vehicle in an operation shutdown state.

If steps S3 and/or S4 of testing the constraints are negative, a modifiable modification of parameters of the function for establishing the setting C(E) of the electric machine 22 is carried out during a step S6 so as to generate a setting making it possible to comply with the constraints S3 and S4, and the loop resumes at step S2.

Figure 1:
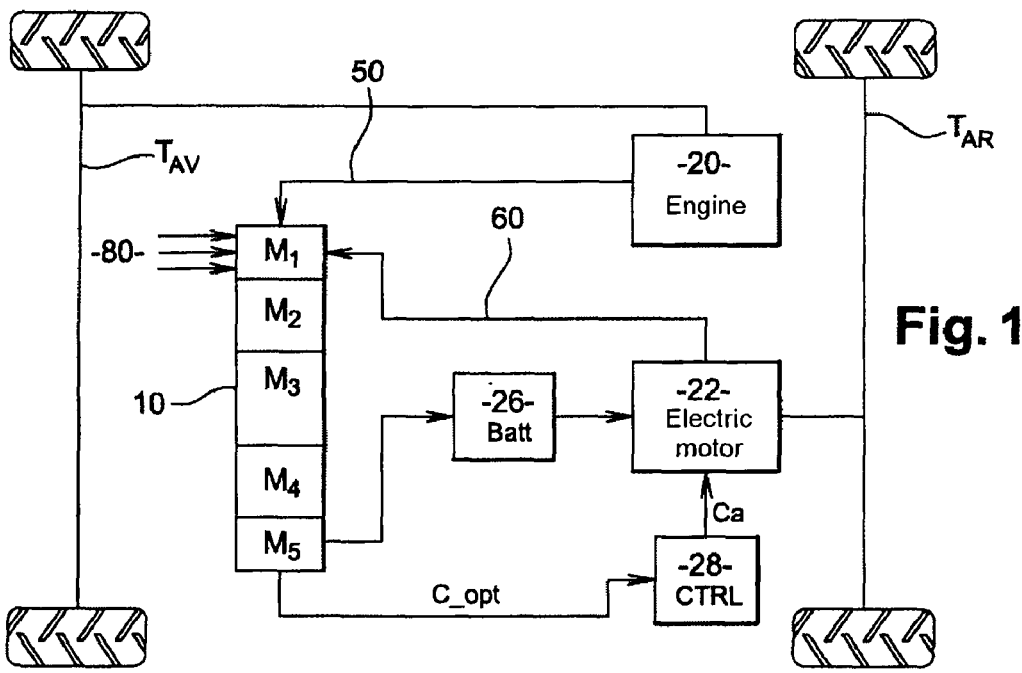
FIG. 1 is a diagrammatic view of a hybrid vehicle in which a supervision device according to a particular mode of the invention is installed.

The hybrid vehicle, represented in a particular embodiment of the invention in FIG. 1, comprises an engine 20, mechanically coupled to the drive wheels of the front axle unit Tav of the vehicle. A battery 26 is itself connected via an electric machine 22 driving the rear axle unit Tar of the vehicle. The electric machine 22 is controlled by a controller 28 which receives an operating setting, via the supervision device 10 implementing the method of the invention, such as a torque setting and/or a revs setting. The controller 28 formulates, on the basis of the settings, a torque and/or revs control Ca which is taken into account by the electric machine 22 connected to the battery 26.

The engine 20, itself connected to a controller (not represented), distinct or not from the controller 28, thus makes it possible to drive the vehicle in the case where the state of charge of the battery 26 supplying the electric motor 22 is low, or else to recharge the battery 26 by making the electric machine 22 work in generator mode or another machine (not represented) operating as a generator.

The battery 26 comprises a plurality of cells (not represented) electrically connected so as to produce or receive the electrical energy under predetermined voltages and current strengths.

The vehicle finally comprises a control and supervision device 10 which is connected—50, 60—to the engine 20, to the electric machine 22 and 80 to sensors (not represented) and which transmits to the controller 28 control settings for the electric machine 22 and control settings to the battery 26.

Figure 5:
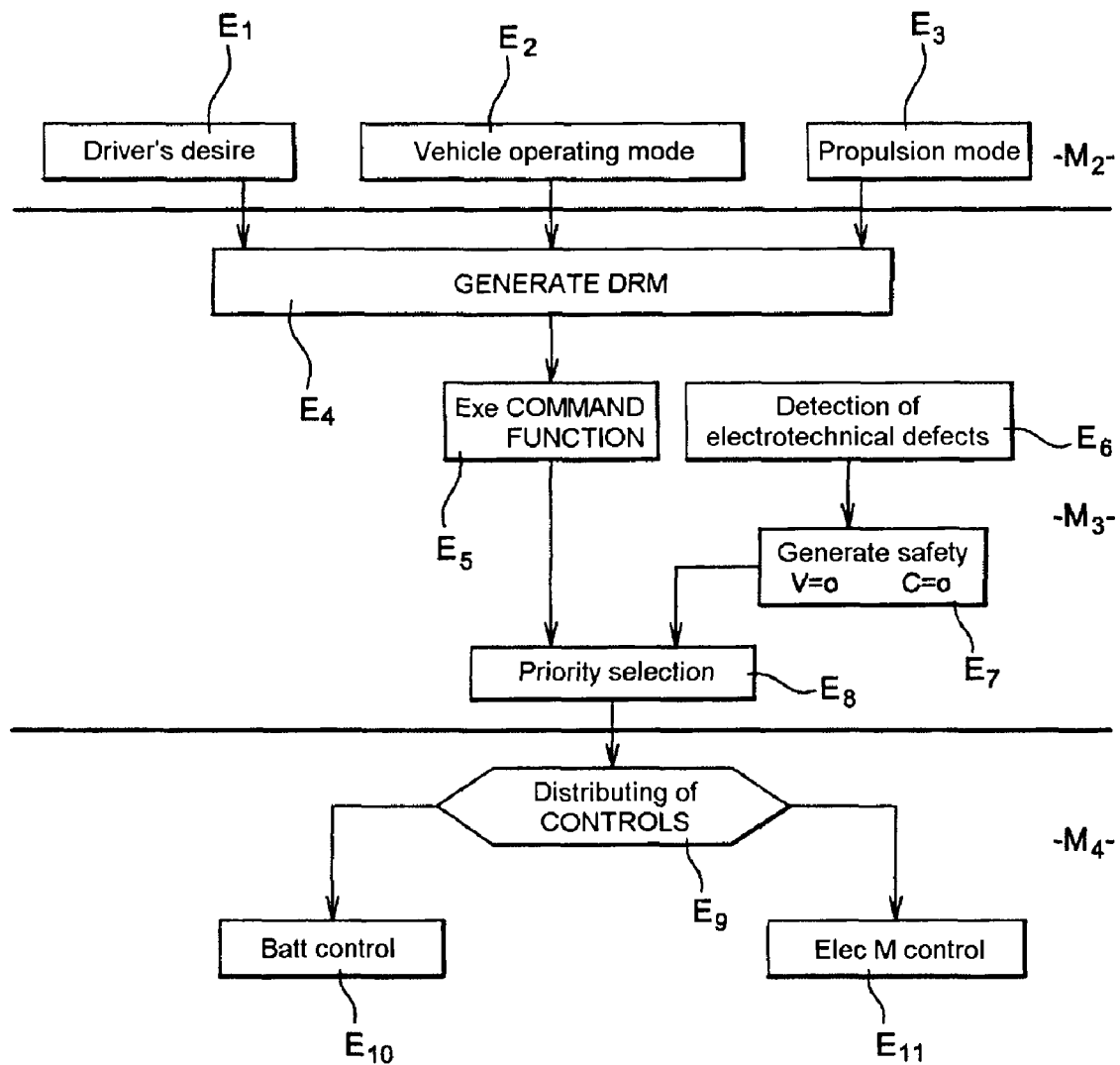
FIG. 5 is a diagram detailing the steps of the supervision and control method according to the invention.

Represented in FIG. 5 is the sequence of the steps executed by the supervision and control method of the invention.

The method of the invention executes three first control steps in parallel.

The method of the invention executes a first step E1 in the course of which a signal detecting the driver's desire is calculated on the basis of signals such as emergency stop wired signals, various dashboard switches indicating the driver's desire.

It executes in parallel a step E2 in the course of which will be collected information relating to the operating mode of the hybrid vehicle, in particular the operating state of the electric motor 22.

The method of the invention executes a third step E3 of detecting the mode of propulsion of the hybrid vehicle and in the course of which will be collected information on the revs of the vehicle operating either in pure thermal mode, or in pure electrical mode, or in hybrid mode, and information on the dynamics of the four wheels of the vehicle.

Once this information has been collected, the controller passes to a step E4 of generating a DRM command variable. The DRM command variable can take several values which each control the execution of a function commanding a mode of propulsion, and a mode of operation which are chosen by the driver and are interpreted in the course of the previous steps E1, E2 and E3.

A step E5 of the method of the invention consists in the command for execution of the command function associated with the value of the DRM variable generated in the previous step E4.

In parallel, the method of the invention executes a step E6 of detecting the electrotechnical defects, such as for example abnormal overcharging of the battery 26 or else a ground defect of the electric machine, on the basis of the information on the operating defects of the battery 26 and of the electric machine 22 traveling through a communication bus.

If an electrotechnical anomaly is detected, a safety function is activated in the following safety generation step E7. This safety function imposes a zero torque on the electric machine 22 and a zero voltage on the battery 26 so as to avoid a possible impairment of these electrical items.

A priority selection step E8 receives as input the information vectors of the step of executing the command function E5 and of the safety generation step E7. If an electrotechnical anomaly has been detected in step E6, then step E8 transmits by priority the command for execution of the safety function to protect the electrical items, whatever command function is activated in step E5. If the safety function has not been activated, then step E8 transmits the command for execution of the command function selected.

The step of distributing the commands E9 receives the command for execution of the previous step E8 and distributes the torque and voltage controls respectively in step E11 for control of the electric machine 22 and in step E10 for control of the battery 26.

Figure 2:
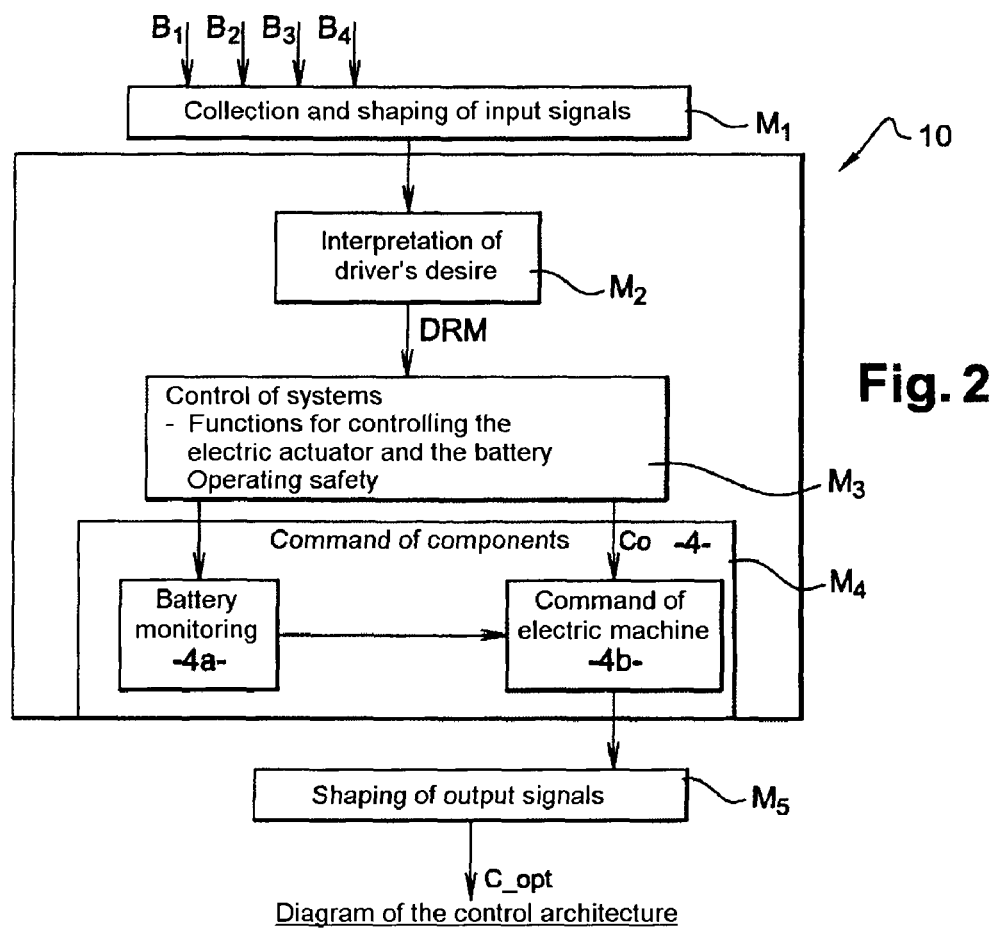
FIG. 2 is a block diagram representing the control architecture of the supervision device according to a particular mode of the invention.

In a particular embodiment of the invention, the supervision device, represented in greater detail in FIG. 2, exhibits an architecture with three successive functional layers. It comprises:

means M1 for collecting information relating to the operating state of the engine 20 and of the electric machine 22 as well as the driver's desire; and means M5 for shaping the output signals.

means M2, constituting a first functional layer, for interpreting, as a function of the information collected by the collection means M1, the driver's desire;

control means M3, constituting a second functional layer, selecting a command function and/or a safety function on the basis of the interpretation of the driver's desire arising from the interpretation means M2;

means M4, constituting a third functional layer, for commanding, on the basis of the command and/or safety function selected by the control means M3, the components for monitoring the electrical items such as the battery 26 and the electric machine 22.

The role of the means for collecting information M1 is to select the signals necessary for control. The signals thus selected are processed, that is to say rescaled or filtered. These signals come from various communication buses B1, B2, B3 and B4, represented in FIG. 2, which collect in particular information on the engine 20, the electric machine 22, the vehicle dynamics, the driver's desire, the signals relating to the controls of the dashboard, etc.

The means M2 for interpreting as a function of the information collected by the collection means M1 comprises means for analyzing the signals traveling through the buses B1, B2, B3 and B4 and shaped by the collection means M1 and means for generating as a function of this information a DRM command variable whose value is associated with a command function or a safety function.

Figure 3:
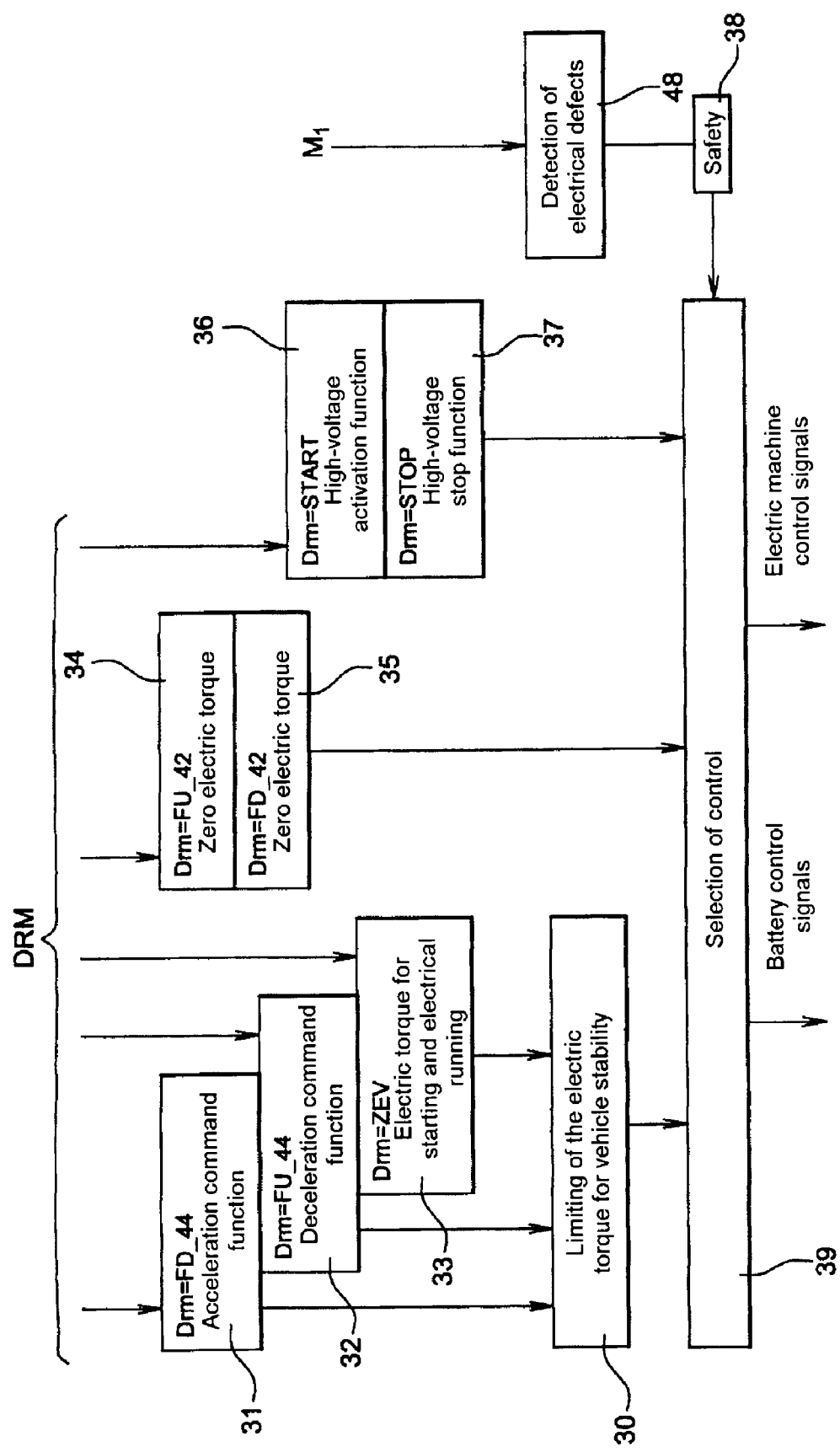
FIG. 3 is a block diagram of a part of the control architecture of FIG. 2.

There are various command functions, schematically represented in FIG. 3, corresponding to various running modes of the vehicle, for example the thermal mode where the engine 20 alone drives the vehicle, the pure electrical mode or the hybrid mode. These command functions are activated by means which calculate settings with a view to controlling the electrical items as a function of the driver's desire, but also of the vehicle's stability conditions and of the protection of the electrical items.

The safety function is activated upon a major defect on an electrical item, by means which transmit a zero electrical torque setting and disconnects the battery 26 from the remainder of the electrical circuit.

The means M3 for controlling the electric actuator receives as input the DRM command variable arising from the interpretation means M2 making it possible to select the command function and/or the safety function corresponding to the value of the DRM variable and determines a control torque setting Co transmitted to the command means M4.

The means M4 for commanding the components for monitoring the electrical items, in particular the battery 26 and the electric machine 22, comprise two sub-blocks, represented in FIG. 2.

The first sub-block 4a is a means for monitoring the battery 26 and comprises means for actuating a contactor (not represented) isolating the battery 26 from the remainder of the vehicle so as to avoid any impairment.

The second sub-block 4b constitutes a means for commanding the electric machine 22 which receives as input the electrical torque setting Co requested by one of the control functions of the control means of the systems M3 and the control of the contactor coming from the sub-block 4a. The sub-block 4b also comprises means for calculating a torque setting C_opt suited to the electrical item operating limitations related to the stability of the vehicle and to the state of the battery 26.

Finally the means M5 shapes, that is to say rescales and/or filters, the output signals coming from the command means M4 and transmits them to the controller 28 of the electric machine 22.

In a particular embodiment, the means M1 for collecting information comprises several sensors which log:
- information, traveling through the bus B1, describing the state of the control of the engine 20, in particular, the position of the acceleration pedal of the vehicle, the effective mean torque (estimation of the crankshaft torque), the position of the brake pedal, the status of the engine;
- information, traveling through the bus B2, on the electrical items of the vehicle in particular the rotation speed of a rotor (not represented) generally coupled to the electric motor 22, the various operating defects, the temperature of the battery 26, the voltage and the current of the battery 26, the acceptable power under charge and under discharge through the battery 26, the latter's state of charge;
- information, traveling through the bus B3, relating to the dynamics of the vehicle in particular the speeds of the four wheels, the braking pressures of the four wheels, a measurement of the longitudinal acceleration of the vehicle;
- and signals, traveling through the bus B4, such as the emergency stop wired signals, various dashboard switches indicating the driver's desire, signals of the defect detectors coming from the battery 26.

The information thus collected is interpreted by the means M2. The means M2 comprises means for analyzing the information collected by the means M1 and means for transmitting as a function of this information a DRM variable whose value actuates an associated command or safety function.

Figure 4:
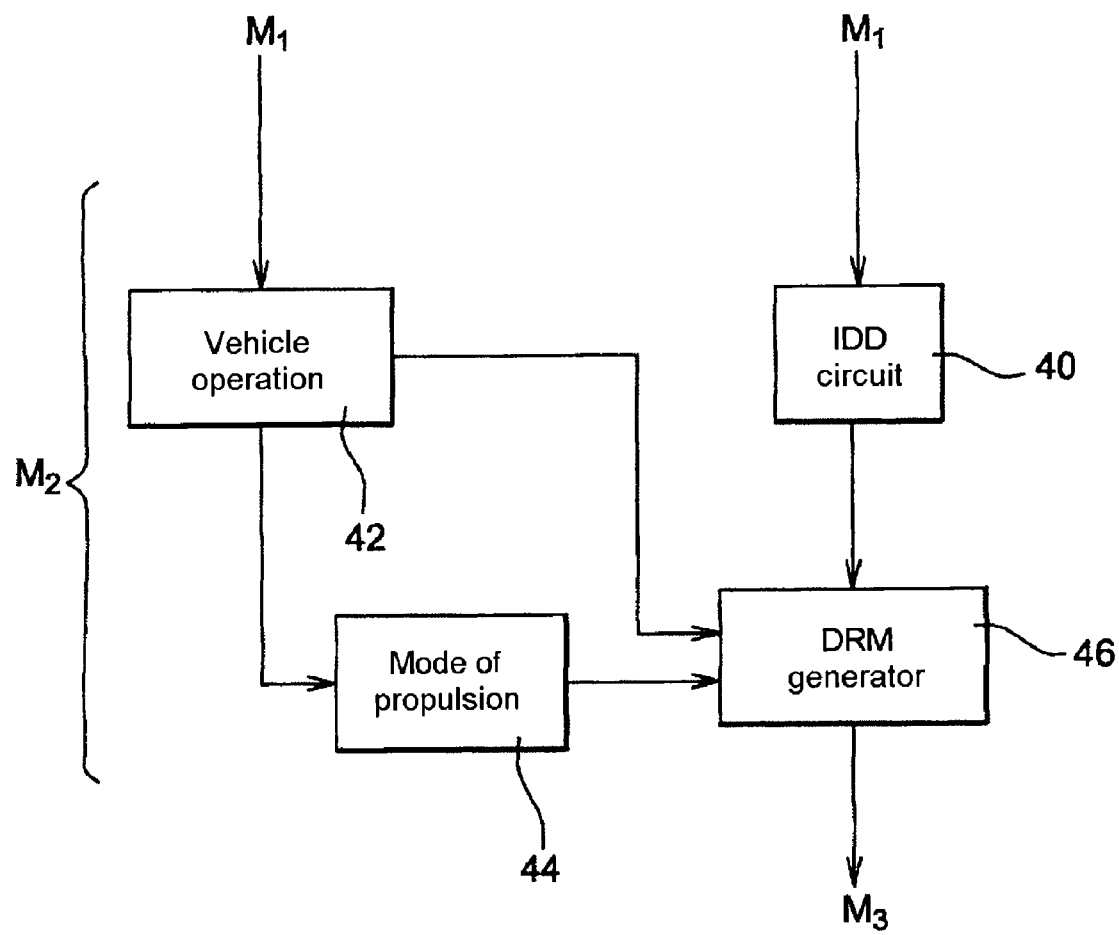
FIG. 4 is a block diagram of another part of the control architecture of FIG. 2.

Represented in FIG. 4 is a block diagram of the circuit of the means M2 for interpreting the driver's desire according to an embodiment of the invention and which leads up to the generation of a value of command variable DRM.

The means M2 comprises an IDD circuit for interpreting the driver desire 40, which implements step E1 of the method of the invention. The IDD circuit 40 receives from the means M1 the information on the driver's desire conveyed in particular by the position of the pedals, control signals coming from the dashboard, etc. Once the driver's desire has been analyzed, it is transmitted to the circuit 46 generating the DRM command variable, so as to control the execution of the appropriate command function.

The means M2 comprises a circuit 42 which implements step E2 of the method of the invention to determine the vehicle operating mode. The block for detecting operation of the vehicle 42 detects, on the basis of the information coming from the means M1, whether the electric motor 22 and the engine 20 are off or on and dispatches an appropriate signal to the circuit 46 generating the DRM command variable.

The means M2 comprises a circuit 44 which implements step E3 of the method of the invention to detect the mode of propulsion of the vehicle. The block 44 detects the mode of propulsion of the vehicle on the basis of the signal transmitted by the vehicle operation detection block 42, to determine whether the vehicle should run in pure thermal, pure electrical or else in hybrid mode.

The means M2 for interpreting the driver desire finally comprises a DRM command variable generator 46, receiving the signals from the circuits 40, 42 and 44 previously described so as to establish a DRM command value associated with a command function suited to the driver's desire.

The DRM variable controls means for selecting one of the command or safety functions. More precisely, the aim of the DRM variable is to activate a command function or a safety function in the following control step. The DRM variable can take various values, including in particular:
- the value SBY to activate the starting of the vehicle;
- the value START when the driver wishes to start the hybrid vehicle;
- the value STOP when the vehicle is stopped;
- the value FU_42 under deceleration when the driver chooses to run in pure thermal mode;
- the value FU_44 under deceleration when the driver chooses to run in hybrid mode;
- the value FD_42 under acceleration when the driver chooses to run in pure thermal mode;
- the value FD_44 under acceleration when the driver chooses to run in hybrid mode;
- the value ZEV in pure electrical mode.

Each of these values of DRM is associated with a command function which is activated by virtue of the control means M3, represented in greater detail in FIG. 3.

These functions group together means for commanding the electric actuators which are activated or not according to the driver's desire and means for taking into account the safety parameters of the electrical items.

Two categories of functions, illustrated in FIG. 3, are distinguished: the command functions controlled by the value of the DRM variable and the safety function.

When DRM dispatches the value SBY, a command function is activated by means for starting the vehicle.

When DRM dispatches the value START, a block 36 executes a command function which implements means for activating the high-voltage electrotechnical part when the driver wishes to start the vehicle in hybrid mode.

When DRM dispatches the value STOP, a block 37 executes a command function which implements means for turning off the electrotechnical items when the vehicle is stopped.

When DRM dispatches the value FU_42, under deceleration in pure thermal mode, a block 34 executes a command function which implements means for placing the electric machine 22 on standby, that is to say for imposing a zero electrical torque setting on it.

When DRM dispatches the value FD_42 under acceleration in pure thermal mode, a block 35 executes a command function which implements means for placing the electric machine 22 on standby, that is to say for imposing a zero electrical torque setting on it.

The control settings arising from the execution of the previous command functions are transmitted to a control selection block 39 which transmits the control signals for the battery 26 to the item for monitoring the battery 4a of the means M4 and the control signals for the electric machine 22 to the item for commanding the electric machine 4b of the means M4.

When DRM dispatches the value FD_44, under acceleration in hybrid mode, a block 31 executes a command function which implements means for propelling the vehicle in four-wheel drive mode where the, nonzero, electrical torque is proportional to the crankshaft torque or else calculated so as to optimize the motricity of the vehicle and the ground bond;

When DRM dispatches the value FU_44, a block 32 executes a command function which implements means for recovering electrical energy under deceleration of the vehicle in hybrid mode by making the electric machine 22 operate in generator mode so as in particular to recharge the battery 26;

When DRM dispatches the value ZEV in pure electrical mode, a block 33 executes a command function which activates means for calculating the electrical torque on the basis of the vehicle's accelerator pedal position so as to establish a ramping of automatic gearbox type: a ramping in torque during the starting of the vehicle and a ramping in speed onwards of a given threshold, generally when the vehicle is running.

For these last three functions, the electrical torque value transmitted is nonzero. The value of the torque setting calculated by these functions is limited by the limitation block 30 so as to satisfy the stability and ground bond conditions of the hybrid vehicle running in four-wheel drive mode, that is to say to verify the distribution of the driving torque to each of the vehicle's axle units.

The safety function is executed by the safety block 38 linked to the block for detecting electrical defects 48. The block for detecting the electrical defects 48 receives as input the information relating to the operation of the battery 26 from the information means M1 and detects possible operating anomalies.

If an electrical defect is detected, a signal is transmitted to the safety block 38 activating the safety function so as to dispatch a zero torque setting to the electric machine 22 and a zero voltage to the battery 26 electrically isolating the battery 26 from the remainder of the vehicle so as to prevent any impairment of the electrical items. This safety function is activated in the event of a major operating defect of the electrotechnical part, such as for example when the voltage of the battery 26 is no longer in a predetermined safety interval.

The safety function has priority over the other command functions, which implies that any command function is suspended during the execution of the safety function.

The safety function then transmits the settings to the control selection block 39 which transmits by priority the safety settings.

The means M4 for commanding the components for monitoring the electrical items, in particular the battery 26 and the electric machine 22 comprise two sub-blocks, represented in FIG. 2:

the first sub-block 4a represents a means for monitoring the battery 26;
the second sub-block 4b represents a means for commanding the electric machine 22.

The first sub-block 4a comprises means for actuating a contactor (not represented) isolating the electrical items from the remainder of the vehicle so as to avoid any impairment.

The second sub-block 4b constitutes a means for commanding the electric machine 22 receives as input the electrical torque setting Co requested by one of the control functions of the control means of the systems M3 and the control of the contactor coming from the sub-block 4a. The sub-block 4b also comprises means for calculating a torque setting suited to the operating limitations of the electrical items.

Finally the means M5 shapes the output signals coming from the command means M4 and transmits them to the controller 28 so as to control the electric machine 22 and to the battery 26.

The invention claimed is:

1. A method for controlling and supervising a hybrid vehicle including a driving engine, and an electric machine able on command to operate as a driving motor and supplied by a battery, the method comprising:
   detecting an operating state of the vehicle;
   producing, in response to the detecting, an operating setting for the electric machine only, without demanding any particular control of the engine;
   executing a first test to determine if the operating setting complies with a stability constraint for the vehicle; and
   if the operating setting complies with the stability constraint for the vehicle, executing a second test to determine if the operating setting complies with a protection constraint for electrical items of the vehicle.

2. The method of control and supervision as claimed in claim 1, further comprising:
   collecting information on an operating state of the engine, of an electric actuator, and a driver's desire;
   generating a command value on the basis of the information collected, which commands command functions;
   commanding the electric actuator on the basis of the command value, which executes a command function as a function of the driver's desire;
   activating, in event of an electrotechnical defect, a safety function imposing a zero torque on the electric machine and that disconnects the battery from the electric machine;
   activating, by priority over the command function, the safety function in the event of the electrotechnical defect; and
   controlling the electrical items that transmits control signals to the battery and to the electric machine on the basis of the activated safety function.

3. The method of control and supervision as claimed in claim 2, wherein the electrotechnical defect includes a voltage of the battery being outside a predetermined safety interval and a ground defect of the electric machine.

4. The method of control and supervision as claimed in claim 2, wherein the collecting information on the operating state of the engine, of the electric actuator, and the driver's desire includes collecting information from plural sensors of different kinds that pertain to signals:
   on control of the engine, position of an acceleration pedal, effective mean torque, position of a brake pedal, status of the engine;
   on the electrical items of the vehicle, speed of the electric machine, various operating defects, temperature of the battery, voltage and current of the battery, acceptable power under charge and under discharge through the battery and the battery state of charge;
   on dynamics of the vehicle, speeds of four wheels, braking pressures of the four wheels, a measurement of longitudinal and lateral acceleration of the vehicle, a measurement of angle of deflection of a steering wheel, a measurement of yaw rate; and
   signals of emergency stop wired signals, various dashboard switches conveying the driver's desire, signals of isolation defect detectors coming from the battery.

5. A device for controlling and supervising a hybrid vehicle, comprising:
   a driving engine;
   an electric machine able on command to operate as a driving motor and supplied by a battery;
   a first module that detects an operating state of the hybrid vehicle, which produces an operating state vector; and
   a second module that makes it possible to establish a setting on the basis of the operating state vector, the second module cooperating with a stability control unit for the vehicle and an electrotechnical protection unit for electrical items of the vehicle, the setting being applied to the electric machine alone of the hybrid vehicle
   wherein the device is configured to execute a first test to determine if the setting on the basis of the operating state vector complies with a stability constraint for the vehicle and, if the setting complies with the stability constraint for the vehicle, to execute a second test to determine if the setting complies with a protection constraint for electrical items of the vehicle.

6. The control and supervision device as claimed in claim 5, further comprising:
    means for collecting information relating to an operating state of the engine and of the electric machine, and a driver's desire;
    means for interpreting, as a function of the information collected by the means for collecting, the driver's desire;
    control means for selecting a command function and/or a safety function on the basis of the interpretation of the driver's desire arising from the means for interpreting;
    means for commanding, on the basis of the command and/or the safety function selected by the control means, components for monitoring the electrical items of the battery and the electric machine; and
    means for shaping the output signals coming from the means for commanding.

7. The control and supervision device as claimed in claim 6, further comprising three successive functional layers:
    a first layer bundling together the means for collecting and means for interpreting, which generate a variable activating the command;
    a second layer bundling together the control means, which execute the command control on the basis of the value of the command variable;
    a third layer bundling together the means for commanding, which execute the command of the components for monitoring the electrical items.

8. The control and supervision device as claimed in claim 7, wherein the means for collecting information comprises plural sensors of different kinds that pertain to signals:
    on control of the engine, position of an acceleration pedal, effective mean torque, position of a brake pedal, status of the engine;
    on the electrical items of the vehicle, speed of the electric machine, various operating defects, temperature of the battery, voltage and current of the battery, acceptable power under charge and under discharge through the battery and the battery state of charge;
    on dynamics of the vehicle, speeds of four wheels, braking pressures of the four wheels, a measurement of longitudinal and lateral acceleration of the vehicle, a measurement of angle of deflection of a steering wheel, a measurement of yaw rate; and
    signals of emergency stop wired signals, various dashboard switches conveying the driver's desire, signals of isolation defect detectors coming from the battery.

9. The control and supervision device as claimed in claim 8, wherein the means for interpreting the driver's desire comprises means for analyzing information coming from the means for collecting and transmitting as a function of the information, a variable whose value selects an associated command or safety function in the following control means.

10. The control and supervision device as claimed in claim 9, wherein the variable is associated with means for selecting one of the command and/or safety functions in the control means, including:
    a function comprising means for activating starting of the vehicle;
    a function that bundles together means for activating an electrotechnical part when the driver wishes to start the hybrid vehicle;
    a function that bundles together means for turning off electrotechnical items when the vehicle is stopped;
    a function that bundles together means for placing the electric machine in a standby mode where the electrical torque is zero, under deceleration in a pure thermal mode;
    a function that bundles together means for recovering electrical energy, under deceleration in a hybrid mode;
    a function that bundles together means for placing an electric actuator in a standby mode where the electrical torque is zero, under acceleration in the pure thermal mode;
    a function that bundles together means for allowing driving of the vehicle in a 4-wheel drive mode, in which the electrical torque is proportional to crankshaft torque or calculated so as to optimize motricity of the vehicle, under acceleration in the hybrid mode;
    a function that bundles together means for calculating electrical torque on the basis of an acceleration pedal position so as to establish a ramping of automatic gearbox type, including a ramping in torque and a ramping in speed above a given threshold, in pure electrical mode; and
    a safety function that bundles together means for dispatching a zero torque setting to the electric machine and for disconnecting a high-voltage main contactor so as to isolate the battery from the remainder of the vehicle in event of a major operating defect of the electrotechnical part.

11. The control and supervision device as claimed in claim 10, wherein the control means comprises a means that limits a value of electrical torque setting so as to satisfy the stability constraint for the vehicle.

12. The control and supervision device as claimed in claim 11, wherein the means for commanding the components for monitoring the electrical items comprises means for monitoring the battery so as to isolate the battery from the remainder of the vehicle.

13. The control and supervision device as claimed in claim 12, wherein the means for commanding the components for monitoring the electrical items comprises command means for the electric machine that comprises means for transmitting to the electric machine a torque setting suited to operating limitations of the electrical items and to vehicle stability.

14. The control and supervision device as claimed in claim 5, wherein the second module is configured to activate, in event of an electrotechnical defect, a safety function that imposes a zero torque on the electric machine and disconnects the battery from the electric machine.

15. The control and supervision device as claimed in claim 14, wherein the electrotechnical defect includes a voltage of the battery being outside a predetermined safety interval and a ground defect of the electric machine.

16. A device for controlling and supervising a hybrid vehicle, comprising:
    a driving engine;
    an electric machine able on command to operate as a driving motor and supplied by a battery;
    a supervision device comprising a first module that detects an operating state of the hybrid vehicle, which produces an operating state vector, and a second module that makes it possible to establish a setting on the basis of the operating state vector, the second module cooperating with a stability control unit for the vehicle and an electrotechnical protection unit for electrical items of the vehicle, the setting being applied to the electric machine alone of the hybrid vehicle,
    wherein the supervision device is configured to
        collect information relating to an operating state of the engine and of the electric machine, and a driver's desire;
        interpret, as a function of the information collected, the driver's desire;

select a command function and/or a safety function on the basis of the interpretation of the driver's desire;

command, on the basis of the command and/or the safety function, components for monitoring the electrical items of the battery and the electric machine; and shape an output signals based on the command, and wherein the supervision device comprises plural sensors of different kinds that pertain to signals:

on control of the engine, position of an acceleration pedal, effective mean torque, position of a brake pedal, status of the engine;

on the electrical items of the vehicle, speed of the electric machine, various operating defects, temperature of the battery, voltage and current of the battery, acceptable power under charge and under discharge through the battery and the battery state of charge;

on dynamics of the vehicle, speeds of four wheels, braking pressures of the four wheels, a measurement of longitudinal and lateral acceleration of the vehicle, a measurement of angle of deflection of a steering wheel, a measurement of yaw rate; and signals of emergency stop wired signals, various dashboard switches conveying the driver's desire, signals of isolation defect detectors coming from the battery.

* * * * *